(12) United States Patent
Ahn et al.

(10) Patent No.: US 8,049,765 B2
(45) Date of Patent: Nov. 1, 2011

(54) COLOR GAMUT MAPPING AND LIQUID CRYSTAL DISPLAY DEVICE USING THE SAME

(75) Inventors: Ji Young Ahn, Gyeonggi-do (KR); Dong Woo Kang, Gyeonggi-do (KR); Choon Woo Kim, Seoul (KR); Qiao Song Chen, Incheon-si (KR); Yu Hoon Kim, Incheon-si (KR)

(73) Assignee: LG Display Co., Ltd., Seoul (KR)

( * ) Notice: Subject to any disclaimer, the term of this patent is extended or adjusted under 35 U.S.C. 154(b) by 747 days.

(21) Appl. No.: 12/213,549

(22) Filed: Jun. 20, 2008

(65) Prior Publication Data

US 2009/0009539 A1    Jan. 8, 2009

(30) Foreign Application Priority Data

Jun. 22, 2007    (KR) .................. 10-2007-0061644

(51) Int. Cl.
| | |
|---|---|
| G09G 5/02 | (2006.01) |
| H04N 5/202 | (2006.01) |
| H04N 17/00 | (2006.01) |
| H04N 9/64 | (2006.01) |
| H04N 5/14 | (2006.01) |
| G06K 9/40 | (2006.01) |
| G06K 9/00 | (2006.01) |

(52) U.S. Cl. ........ 345/589; 345/591; 345/590; 345/606; 348/182; 348/251; 348/649; 348/671; 382/167; 382/254; 382/274

(58) Field of Classification Search .................. 345/581, 345/589, 591, 597–601, 604, 606, 617–619, 345/690, 660; 348/179–182, 251–254, 365–366, 348/441, 469, 466–467, 557, 560, 649, 671; 358/515–525; 382/162–167, 254, 274, 297–300

See application file for complete search history.

(56) References Cited

U.S. PATENT DOCUMENTS

| | | | | |
|---|---|---|---|---|
| 6,778,185 | B1 * | 8/2004 | Moroney ...................... | 345/590 |
| 2002/0163669 | A1 * | 11/2002 | Yamazaki et al. ........... | 358/3.23 |
| 2005/0276473 | A1 * | 12/2005 | Um et al. ...................... | 382/167 |
| 2007/0086028 | A1 * | 4/2007 | Cho et al. ...................... | 358/1.9 |

* cited by examiner

*Primary Examiner* — Wesner Sajous (74) *Attorney, Agent, or Firm* — Morgan, Lewis & Bockius LLP (57) ABSTRACT

A color gamut mapping method, which is capable of minimizing a color difference perceived by a person, preventing brightness and contrast from deteriorating, and improving color reproducibility, and a liquid crystal display device using the same are disclosed. The color gamut mapping method includes converting image data having an original gamut into lightness, chroma and hue data, adjusting a primary hue angle of the original gamut according to a reproduction gamut and adjusting the hue data according to the adjustment amount of the primary hue angle, changing the lightness of an original gamut boundary in consideration of a reproduction gamut boundary and changing the brightness data by the change amount of the lightness of the original gamut boundary, deciding a focal point, which is a reference point of color gamut mapping, according to the size, the shape and the position of the original/reproduction gamut in lightness and chroma coordinates, deciding a mapping slope according to the decided focal point FP and a mapping area in which the lightness and chroma data are located and mapping the original gamut to the reproduction gamut according to the decided mapping slope, and converting the lightness, chroma and hue data mapped to the reproduction gamut into image data.

8 Claims, 6 Drawing Sheets

COLOR GAMUT MAPPING AND LIQUID CRYSTAL DISPLAY DEVICE USING THE SAME

This application claims the benefit of Korean Patent Application No. P2007-0061644, filed on Jun. 22, 2007, which is hereby incorporated by reference as if fully set forth herein.

BACKGROUND OF THE INVENTION

1. Field of the Invention

The present invention relates to a color gamut mapping method, and more particularly, to a color gamut mapping method capable of improving color reproducibility.

2. Discussion of the Related Art

With high resolution and high definition of an image display device, color reproducibility has been improved. Since a color reproduction area, that is, a color gamut, of an image display device varies according to the characteristics of the image display device, a color gamut mapping method of compressing or extending the color gamut according to the characteristics of the image display device is required.

For example, recently, if a standard RGB (hereinafter, referred to as "sRGB") image which is the standard of high-definition television (HDTV) is displayed in a wide color gamut (hereinafter, referred to as "WCG") larger than the color gamut of the sRGB, a color gamut mapping method of extending the color gamut of the sRGB to the WCG is required like a chromaticity coordinate system shown in FIG. 1.

Such a color gamut mapping method should compress or extend the color gamut such that a color difference perceived by a person is minimized. However, since a conventional color gamut mapping method does not consider a hue variation which is sensitively perceived by a person, a color difference of a specific color such as a blue color may vary. In addition, since the shapes and the sizes of an original gamut and a reproduction gamut are not considered, brightness and contrast may deteriorate and thus color reproducibility may deteriorate.

SUMMARY OF THE INVENTION

Accordingly, the present invention is directed to a color gamut mapping method and a liquid crystal display device using the same that substantially obviate one or more problems due to limitations and disadvantages of the related art.

An object of the present invention is to provide a color gamut mapping method which is capable of minimizing a color difference perceived by a person, preventing brightness and contrast from deteriorating, and improving color reproducibility.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a color gamut mapping method includes converting image data having an original gamut into lightness, chroma and hue data; adjusting a primary hue angle of the original gamut according to a reproduction gamut and adjusting the hue data according to the adjustment amount of the primary hue angle; changing the lightness of an original gamut boundary in consideration of a reproduction gamut boundary and changing the brightness data by the change amount of the lightness of the original gamut boundary; deciding a focal point, which is a reference point of color gamut mapping, according to the size, the shape and the position of the original/reproduction gamut in lightness and chroma coordinates; deciding a mapping slope according to the decided focal point FP and a mapping area in which the lightness and chroma data are located and mapping the original gamut to the reproduction gamut according to the decided mapping slope; and converting the lightness, chroma and hue data mapped to the reproduction gamut into image data.

The color gamut mapping method according to the present invention is applicable to a color gamut compression method, a color gamut extension method and a liquid crystal display device.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, exemplary embodiments of the present invention will be described in detail with reference to FIGS. 2 to 7.

Figure 2:
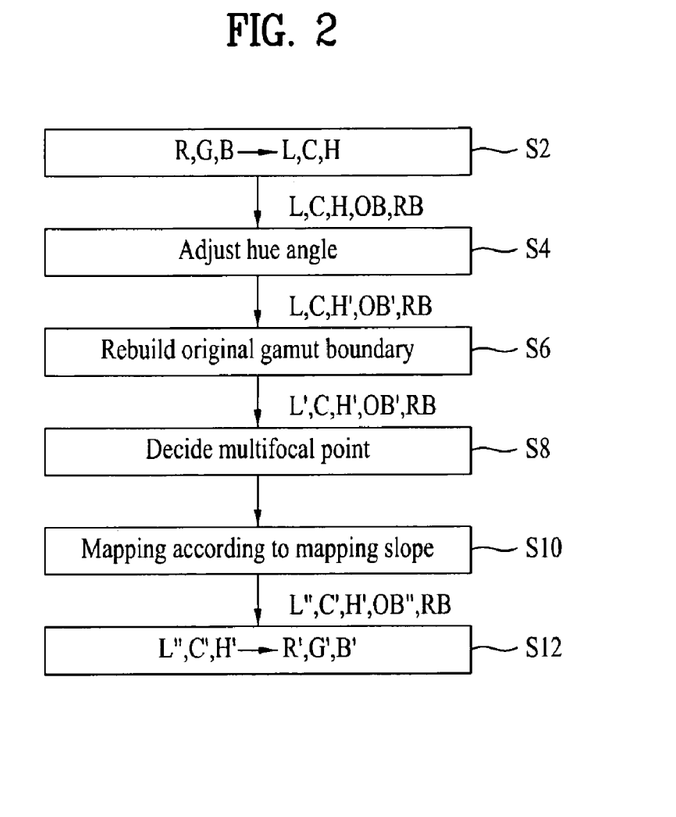
FIG. 2 is a flowchart illustrating a color gamut mapping method according to an embodiment of the present invention.

FIG. 2 is a flowchart illustrating a color gamut mapping method according to an embodiment of the present invention.

In a step 2 (S2), lightness (L) data, chroma (C) data and hue angle (H) data, LCH data (OB) of original gamut boundary points and LCH data (RB) of reproduction gamut boundary points for one pixel of an input image are input. For example, the LCH data (OB) of the original gamut boundary points includes LCH data of boundary points of the color gamut of the sRGB shown in FIG. 1 and the LCH data (RB) of the reproduction gamut boundary points includes LCH data of boundary points of the WCG. RGB data of the input pixel is converted into the LCH data by a color coordinate converting process and the LCH data is input. The RGB data of the input pixel is converted into the LCH data by converting the RGB data into an XYZ color coordinate by a sRGB standard converting equation, converting the XYZ color coordinate into a Lab color coordinate, and converting components a and b into C and H data by Equations 1 and 2.

$$C = \sqrt{a^2 + b^2} \qquad \text{Equation 1}$$

$$H = \tan^{-1}\frac{b}{a} \qquad \text{Equation 2}$$

Figure 3:
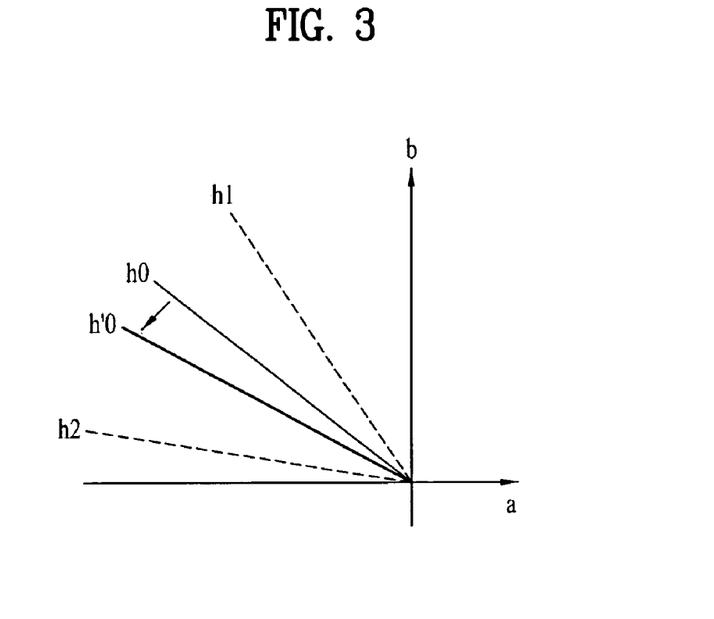
FIG. 3 is a view illustrating a step of adjusting a hue angle shown in FIG. 2.

In a step 4 (S4), the hue angle is adjusted for accurate mapping of a primary color. As shown in FIG. 3, the primary hue angle h0 of the original gamut is converted into the primary hue angle h'0 of the reproduction gamut. A hue angle range (h1, h2), in which the hue angle needs to be adjusted, is set, the hue angle is adjusted to be smoothly changed in the set range (h1, h2), and the hue angle is not changed outside the set range. If the hue angle h of the input pixel is in the hue angle range (h1, h2), the hue angle h of the input pixel is converted into an output hue angle h' by Equation 3 or 4, for smooth hue conversion.

$$h' = h + (h'0 - h0) - (h0 - h) \times \frac{h'0 - h0}{h0 - h1}; h \leq h0 \qquad \text{Equation 3}$$

$$h' = h + (h'0 - h0) - (h - h0) \times \frac{h'0 - h0}{h2 - h0}; h > h0 \qquad \text{Equation 4}$$

Equation 3 shows the output hue angle h' in the case where the input hue angle h is less than or equal to the primary hue angle h0 of the original gamut, that is, in the case where the input hue angle h is between the primary hue angle h0 of the original gamut and a minimum value h1 of the hue angle range. Equation 4 shows the output hue angle h' in the case where the input hue angle h is greater than the primary hue angle h0 of the original gamut, that is, in the case where the input hue angle h is between the primary hue angle h0 of the original gamut and a maximum value h1 of the hue angle range. In Equations 3 and 4, the input hue angle h is changed by a change h'0-h0 in primary hue angle. Since the change h'0-h' is changed according to an interval between the primary hue angle h0 of the original gamut and the input color angle h, it can be seen that the change in the input hue angle h is decreased if the input hue angle h is close to the primary hue angle h0 of the original gamut and the change in the input hue angle h is increased if the input hue angle h is distant from the primary hue angle h0. By the step (S4) of adjusting the hue angle, H data of the LCH data of the input pixel is changed to H' and the H data included in the data (OB) of the original gamut boundary points is changed such that OB is changed to OB'.

Figure 4:
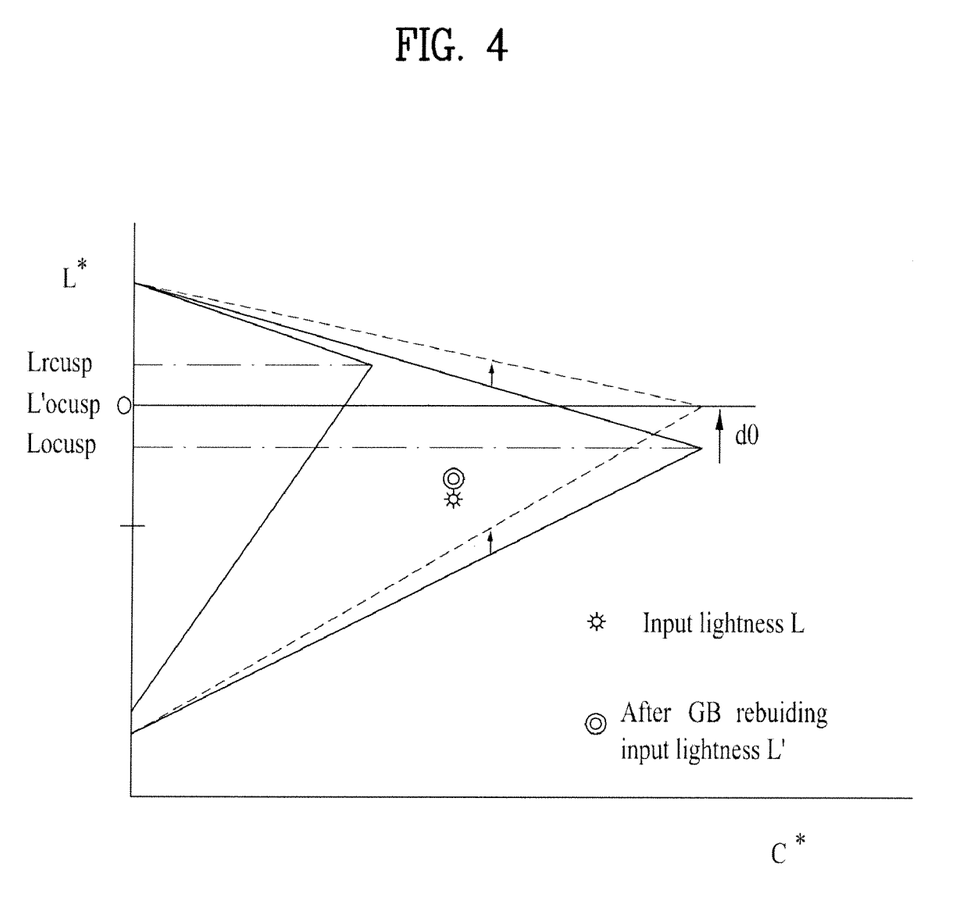
FIG. 4 is a view illustrating a step of rebuilding a color gamut boundary shown in FIG. 2.

Next, in a step 6 (S6), the original gamut boundary is rebuilt. If the chroma (C) is rapidly changed in high lightness L in an LC plane, contour noise may occur at the time of compression of the color gamut. Therefore, in order to prevent the contour noise, the original gamut boundary is rebuilt by changing a lightness (L) component. FIG. 4 is a view illustrating the step of rebuilding the original gamut boundary by changing the L component. In FIG. 4, Locusp denotes the lightness of the cusp of the original gamut, Lrcusp denotes the lightness of the cusp of the reproduction gamut, and L'ocusp denotes the changed lightness of the cusp of the original gamut. It can be seen that the chroma is not changed when the lightness Locusp of the cusp of the original gamut is changed to L'ocusp. In FIG. 4, the change distance d of the cusp of the original gamut boundary is determined by the lightness Locusp of the cusp of the original gamut boundary, an average value d0 of the lightness Lrcusp of the cusp of the reproduction gamut boundary, the chroma Cocusp of the cusp of the original gamut boundary and the chroma Cob of the original gamut boundary as expressed by Equation 5.

$$d = \frac{1}{2}(Locusp + Lrcusp) \times \frac{Cob}{Cocusp} = d0 \times \frac{Cob}{Cocusp} \qquad \text{Equation 5}$$

By the step (S6) of rebuilding the original gamut boundary, the lightness of the original gamut boundary is changed by d such that OB is changed to OB', and the L data of the input pixel is changed to L' by the change d in the lightness of the original gamut boundary.

Figure 5A:
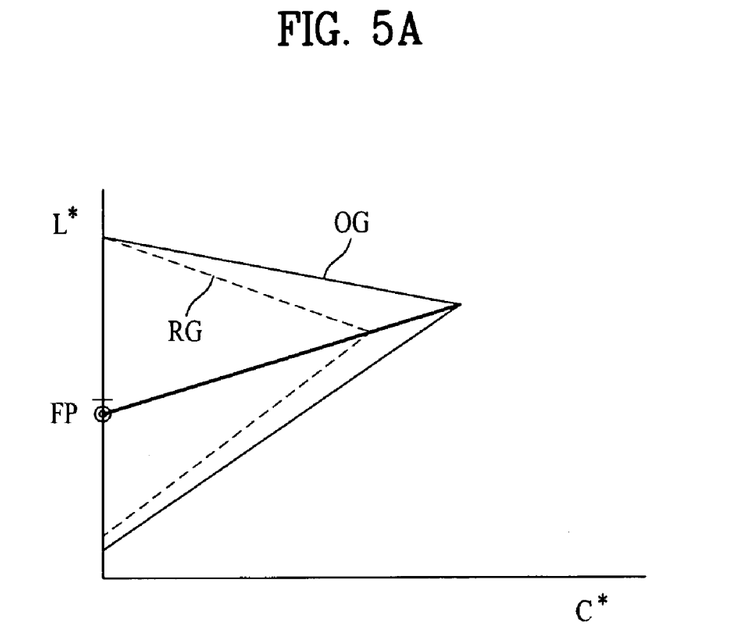
FIGS. 5A and 5B are views illustrating a step of deciding multifocal point shown in FIG. 2.
Figure 5B:
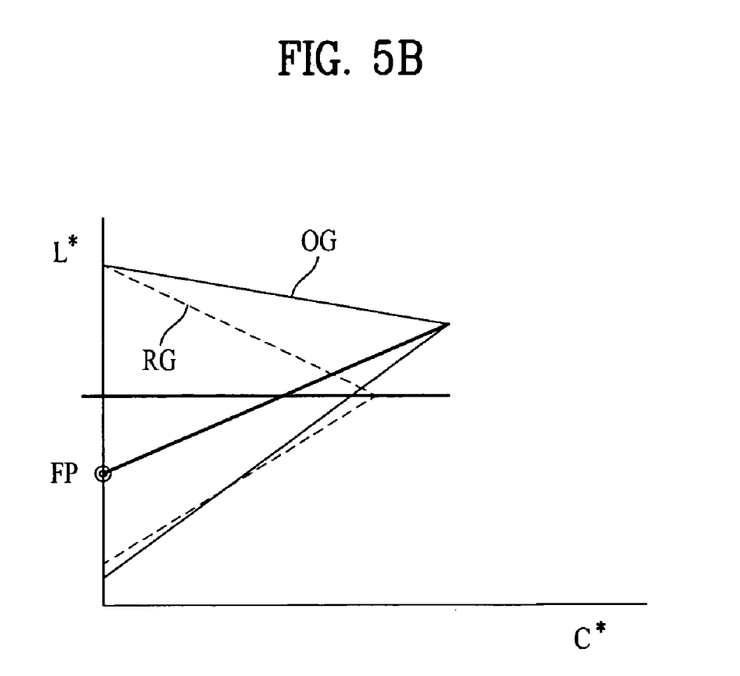

In a step 8 (S8), a focal point FP which is a reference point of the color gamut mapping according to the size, the shape and the position of the original/reproduction gamut is decided. In order to maintain the lightness, the multifocal point is decided as the focal points of the color gamut mapping, as shown in FIGS. 5A and 5B. As shown in FIG. 5A, an intersection of a straight line for connecting the cusp of the original gamut OG with the cusp of the reproduction gamut RG and a lightness (L) axis is in a range of the lightness (L) of the reproduction gamut RG, that is, between the minimum value and the maximum value of the lightness L of the reproduction gamut RG, the intersection is decided as the focal point FP. As shown in FIG. 5b, the intersection of the straight line for connecting the cusp of the original gamut OG with the cusp of the reproduction gamut RG and the lightness (L) axis is not in the range of the lightness (L) of the reproduction gamut RG, a central point between the lightness of the cusp of the reproduction gamut RG and the minimum value of the lightness of the reproduction gamut RG is decided as the focal point FP.

Figure 6A:
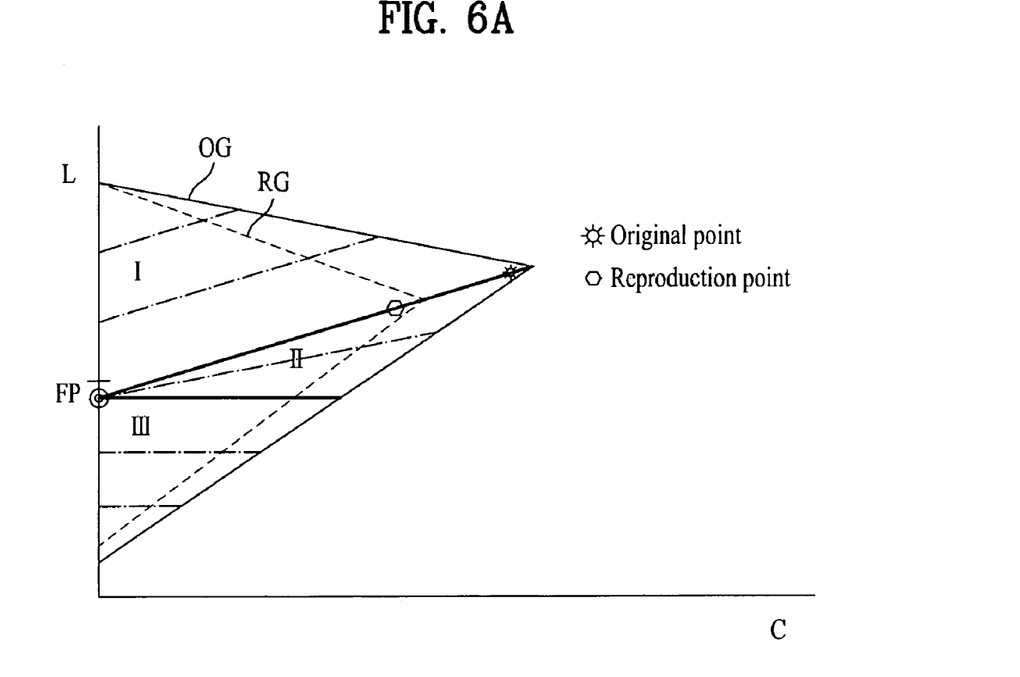
FIGS. 6A and 6B are views illustrating a step of deciding a mapping slope shown in FIG. 2.
Figure 6B:
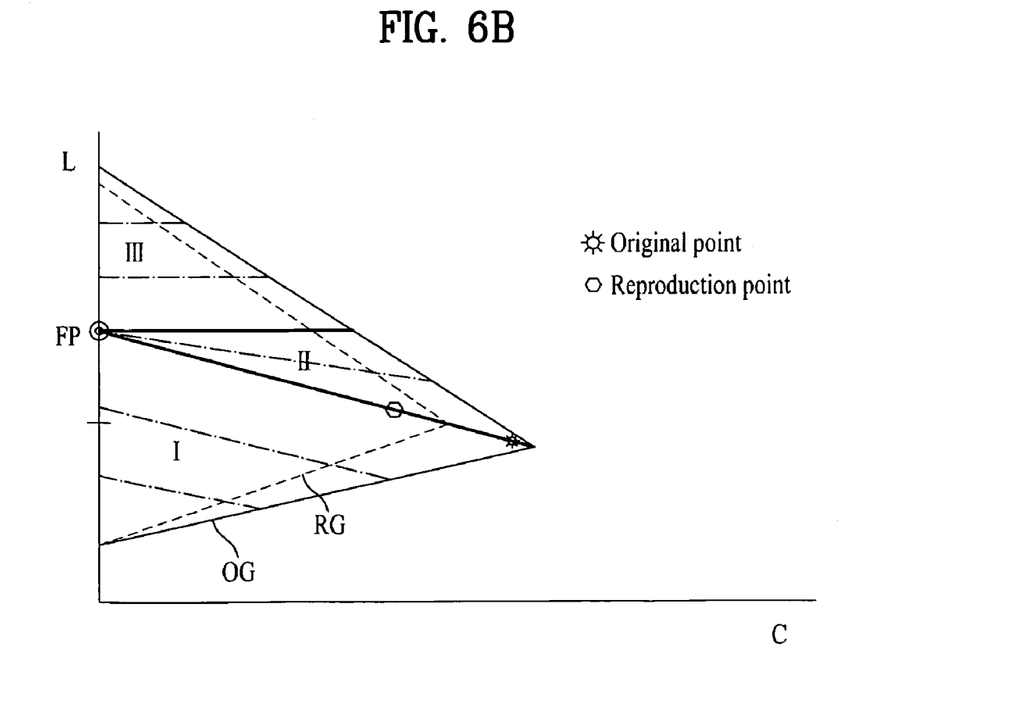

Subsequently, in a step 10 (S10), a mapping slope for deciding a mapping direction is decided according to the focal point FP decided in the step (S8) and a mapping area in which the LC coordinate of the input pixel, and a pixel coordinate of the original gamut OG is mapped to the coordinate of the reproduction gamut RG according to the decided mapping slope of the mapping area. In the step (S8), as shown in FIG. 5A, if the intersection between the straight line for connecting the cusp of the original gamut OG with the cusp of the reproduction gamut RG and the L axis is decided as the mapping focal point FP, the original gamut OG is divided into three areas I, II and III as shown in FIG. 6A or 6B. FIG. 6A shows the case where the mapping focal point FP is less than the cusp of the original gamut OG and the cusp of the reproduction gamut RG and FIG. 6B shows the case where the mapping focal point FP is greater than the cusp of the original gamut OG and the cusp of the reproduction gamut RG, unlike FIG. 6A.

First, in FIGS. 6A and 6B, the input pixel located in the first area I formed by the lightness axis and the straight line for connecting the cusp of the original gamut OG, the cusp of the reproduction gamut RG and the focal point FP is mapped to the reproduction gamut RG according to a first mapping slope having the same inclination as the straight line such that L and C data is changed. The first mapping slope of the first area I is a direction in which the color difference perceived by a person is minimized. The LC coordinate of the input pixel located in the first area I is changed (compressed or extended) by a distance between an intersection of the first mapping slope and the boundary of the original gamut OG and an intersection of the first mapping slope and the boundary of the reproduction gamut RG and the changed L'C' coordinate is output.

Second, in FIGS. 6A and 6B, the input pixel located in the second area II formed by a straight line for connecting the cusp Ocusp of the original gamut OG, the cusp of the reproduction gamut RG and the focal point FP, and a straight line having the same lightness as the focal point FP is mapped to the reproduction gamut according to a second mapping slope which is directed to the focal point FP such that the L and C data is changed. The mapping slope of the second area II prevents the contour noise which may occur between the first and third areas I and III. The LC coordinate of the input pixel located in the second area II is changed (compressed or extended) by a distance between an intersection of the second mapping slope and the boundary of the original gamut OG and an intersection of the second mapping slope and the boundary of the reproduction gamut RG such that the changed L'C' coordinate is output.

Third, in FIGS. 6A and 6B, the input pixel located in the third area III formed by the straight line having the same lightness as the focal point FP and the lightness axis is mapped to the reproduction gamut RG according to a third mapping slope for changing only the chroma while maintaining the lightness such that the C data is changed. In the LC coordinate of the input pixel located in the third area III, only the C coordinate is changed (compressed or extended) by a distance between an intersection of the third mapping slope and the boundary of the original gamut OG and an intersection of the third mapping slope and the boundary of the reproduction gamut RG such that the changed C' coordinate is output.

In a step 12 (S12), L'C'H data of the input image changed by the color gamut mapping method of the step 4 (S4) to the step 10 (S10) is converted into R'G'B' through an XYZ coordinate.

The color gamut mapping method according to the present invention has four steps. That is, the color gamut boundary is decided by the step S4 of adjusting the hue angle and the step S6 of rebuilding the color gamut boundary, and the original gamut is mapped to the reproduction gamut in the lightness-chroma plane by the step S8 of deciding the multifocal point and the mapping step S10 according to the mapping slope of the mapping area. The color gamut mapping method according to the present invention may be used in color gamut compression or color gamut extension.

As a result, in the color gamut mapping method according to the present invention, in consideration of the hue change which is sensitively perceived by the person, since the hue angle is adjusted before mapping the color gamut in the lightness-chroma plane, the color difference perceived by the person is minimized. In the color gamut mapping method according to the present invention, since the color gamut boundary is rebuilt by realigning the boundary of the lightness before simultaneous mapping of the lightness and the chroma, the chroma can be prevented from being rapidly changed and the color difference can be minimized. In the color gamut mapping method according to the present invention, color reproducibility can be improved using the method of mapping the cusp of the boundary of the original gamut to the cusp of the boundary of the reproduction gamut. In the color gamut mapping method according to the present invention, since the multifocal point is used, the mapping area is divided into a plurality of areas, the mapping directions are built according to the mapping slopes whose inclinations vary according to the mapping areas such that the distance is minimized and the original gamut is mapped to the reproduction gamut, thus the lightness and lightness contrast can be maintained.

Figure 7:
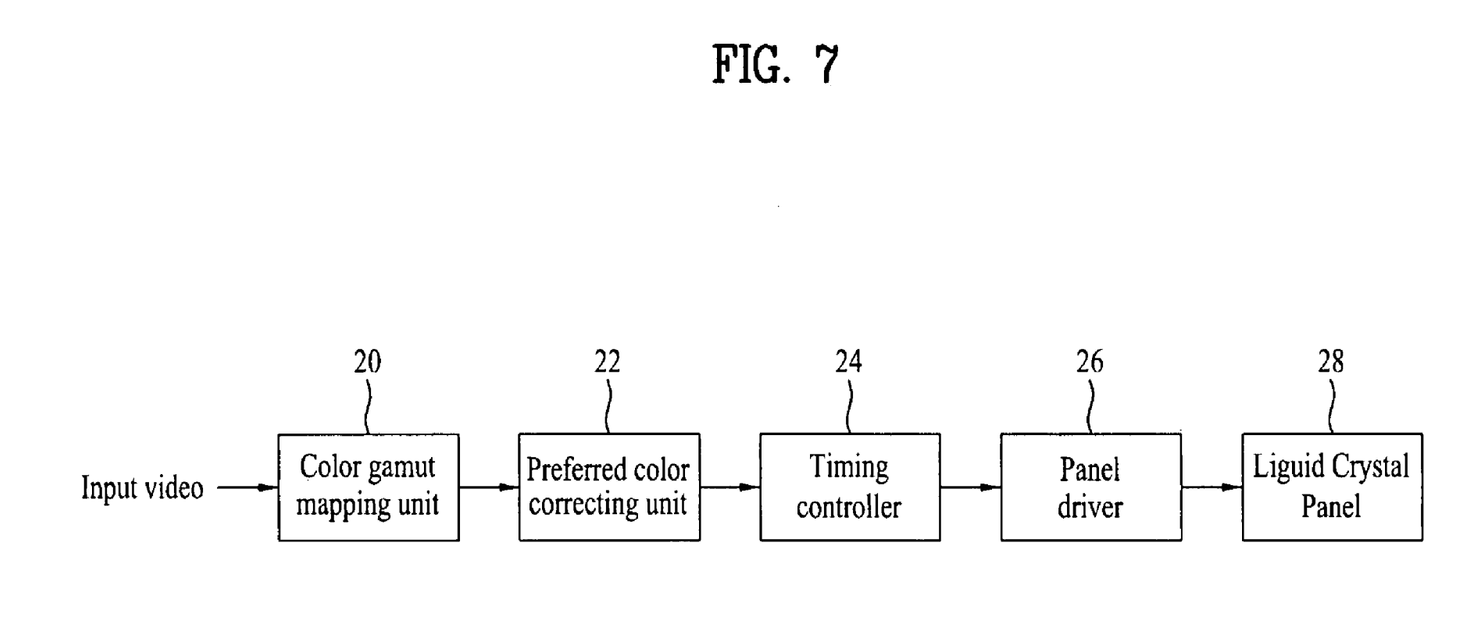
FIG. 7 is a block diagram showing a liquid crystal display device using the color gamut mapping method according to the present invention.

FIG. 7 is a schematic block diagram showing a liquid crystal display device using the color gamut mapping method according to the embodiment of the present invention.

The liquid crystal display device shown in FIG. 7 includes a color gamut mapping unit 20, a preferred color correcting unit 22, a timing controller 24, a panel driver 26 and a liquid crystal panel 28.

Figure 1:
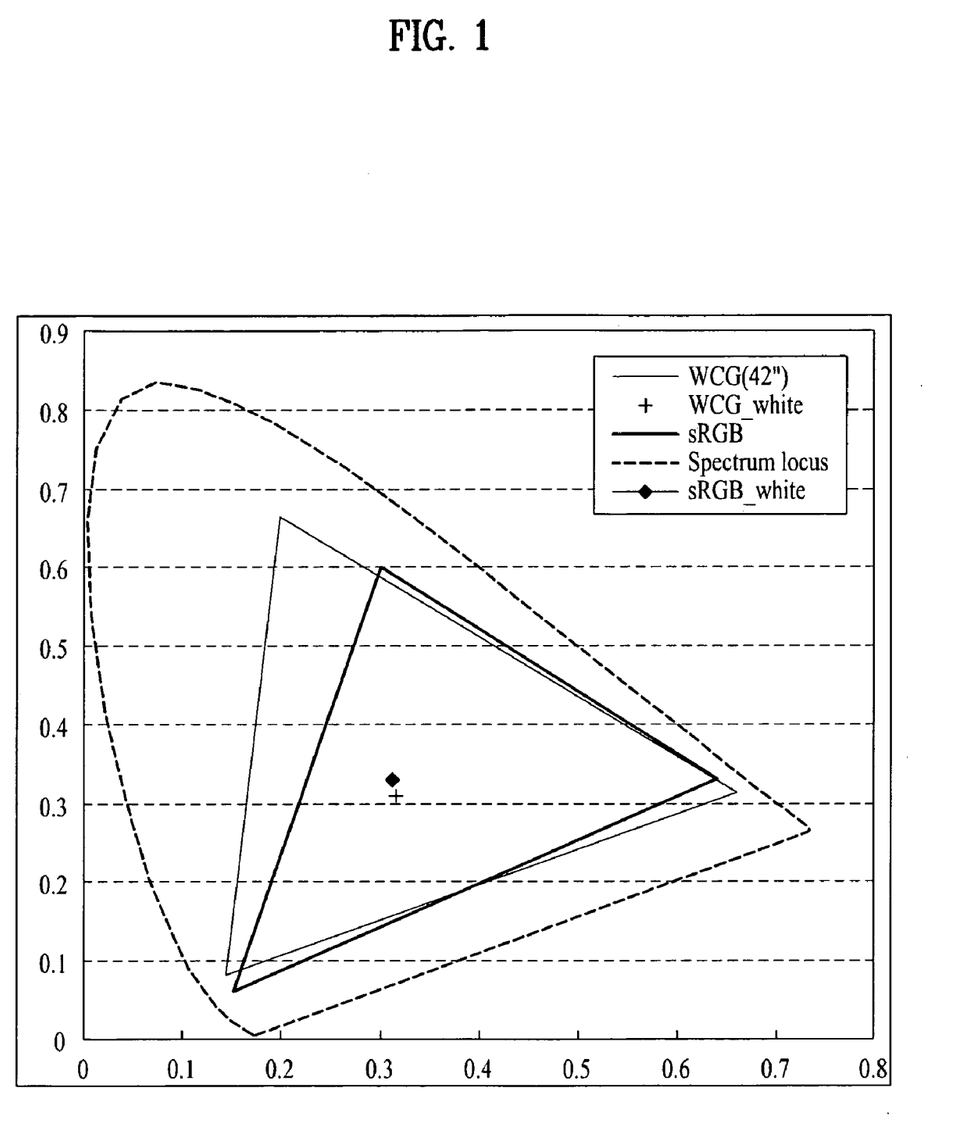
FIG. 1 is a chromaticity coordinate system showing an original gamut and an output gamut of a liquid crystal display device.

The color gamut mapping unit 20 extends and maps the sRGB color gamut of an input image to the WCG of the liquid crystal display device using the color gamut mapping method shown in FIG. 1 and outputs the mapped color gamut. Original gamut boundary information and reproduction gamut boundary information are previously stored. The color gamut mapping unit 20 converts the RGB data of the input image into the LCH data (S2), converts the H data using Equations 3 and 4 (S4), and compensates for the L data by the movement distance d calculated by Equation 5 (S6). Next, the L and C data of the original gamut is mapped to L' and C' data of the reproduction gamut according to the focal point FP decided in consideration of the cusp Ocusp of the original gamut and the cusp Rcusp of the reproduction gamut as shown in FIG. 5A or 5B or the mapping slope decided according to the focal point FP and the mapping area in which the coordinate of the input pixel is located as shown in FIG. 6A or 6B (S10). The color gamut mapping unit 20 inversely converts the L'C'H' data, which is converted into the reproduction gamut by the mapping process, into the R'G'B' data (S12). The color gamut mapping unit 20 is implemented in the form of a lookup table.

The preferred color correcting unit 22 compares the pixel data R'G'B' from the color gamut mapping unit 20 with a preferred color reference value and detects a preferred color pixel. For example, the preferred color correcting unit 22 can detect the preferred color pixel using a double preferred color detecting method including steps of primarily detecting the preferred color pixel using chroma and hue reference values of the preferred color and applying a weight vector to the preferred color pixel detected primarily so as to secondarily detect the preferred color pixel. The preferred color detecting method of the preferred color correcting unit 22 is not specially limited. The preferred color correcting unit 22 compares the detected preferred color pixel with the preferred color reference value and corrects the preferred color to be close to the preferred color reference value. For example, the preferred color correcting unit 22 corrects the preferred color using a weighting function and a correction function according to a difference between average values and reference values of the chroma and the hue of the preferred color pixels. The preferred color correcting method of the preferred color correcting unit 22 is not specially limited.

The timing controller 24 aligns and outputs the input data from the preferred color correcting unit 22 to the panel driver 26 and generates and outputs control signals for controlling driving timings of the panel driver 26 to the panel driver 26.

The panel driver 26 includes a data driver for driving data lines of the liquid crystal panel 28 and a gate driver for driving gate lines. The data driver converts the input data from the timing controller 24 into analog data and outputs the analog data to the data lines of the liquid crystal panel 28. The gate driver sequentially drives the gate lines of the liquid crystal panel 28 in response to the control signals of the timing controller 24.

The liquid crystal panel 28 on which a plurality of pixels are arranged in a matrix displays the image. The pixels exhibits desired colors by a combination of red, green and blue sub-pixels of which light transmission is adjusted by changing the liquid crystal arrangement according to data signals.

The sub-pixels charge difference voltages between the data signals supplied to pixel electrodes through thin-film transistors and a common voltage supplied to a common electrode so as to drive the liquid crystal.

Accordingly, in the liquid crystal display device according to the present invention, color reproducibility can be improved by the color gamut mapping unit 20 and an image in which a preferred color is corrected by the preferred color correcting unit 22 can be displayed with excellent image quality.

As described above, in the color gamut mapping method according to the present invention, in consideration of the hue change which is sensitively perceived by a person, since the hue angle is adjusted before mapping the color gamut in the lightness-chroma plane, the color difference perceived by the person can be minimized. Since the color gamut boundary is rebuilt by realigning the lightness boundary before simultaneous mapping of the lightness and chroma, the chroma can be prevented from being rapidly changed and the color difference can be minimized. Color reproducibility can be improved using the method of mapping the cusp of the original gamut boundary to the cusp of the reproduction gamut boundary. In addition, since the multifocal point is used in consideration of the shapes and the sizes of the original gamut and the reproduction gamut, the mapping area is divided into the plurality of areas, and the mapping directions are built according to mapping slopes whose inclinations vary according to the mapping areas such that the distance is minimized, and the original gamut is mapped to the reproduction gamut, thus the lightness and lightness contrast can be maintained.

Further, in the liquid crystal display device using the color gamut mapping method according to the present invention, color reproducibility can be improved.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A color gamut mapping method of a color gamut mapping unit for a display device comprising:
   converting image data having an original gamut into lightness, chroma and hue data at the color gamut mapping unit;
   adjusting a primary hue angle of the original gamut according to a reproduction gamut and adjusting the hue data according to the adjustment amount of the primary hue angle at the color gamut mapping unit;
   changing the lightness of an original gamut boundary in consideration of a reproduction gamut boundary and changing the brightness data by the change amount of the lightness of the original gamut boundary at the color gamut mapping unit;
   deciding a focal point, which is a reference point of color gamut mapping, according to the size, the shape and the position of the original and/or reproduction gamut in lightness and chroma coordinates at the color gamut mapping unit;
   deciding a mapping slope according to the decided focal point FP and a mapping area in which the lightness and chroma data are located and mapping the original gamut to the reproduction gamut according to the decided mapping slope at the color gamut mapping unit; and
   converting the lightness, chroma and hue data mapped to the reproduction gamut into image data at the color gamut mapping unit.

2. The color gamut mapping method according to claim 1, wherein the change amount of the input hue data is decreased if the input hue data is close to the primary hue angle and the change amount of the input hue data is increased if the input hue data is distant from the primary hue angle.

3. The color gamut mapping method according to claim 2, wherein a change d in lightness of the original gamut boundary is decided by the lightness Locusp of a cusp of the original gamut boundary in a lightness-chroma plane, an average value d0 of the lightness Lrcusp of a cusp of the reproduction gamut boundary, the chroma Cocusp of the cusp of the original gamut boundary, and the chroma Cob of the original gamut boundary as expressed by the following equation $$d = \frac{1}{2}(Locusp + Lrcusp) \times \frac{Cob}{Cocusp} = d0 \times \frac{Cob}{Cocusp}.$$

4. The color gamut mapping method according to claim 3, wherein, if an intersection of a straight line for connecting a coordinate of the cusp of the original gamut with a coordinate of the cusp of the reproduction gamut in the lightness and chroma coordinates and a lightness axis is in a lightness range of the reproduction gamut, the intersection is decided as the focal point of the color gamut mapping and, if the intersection of the straight line for connecting the coordinate of the cusp of the original gamut with the coordinate of the cusp of the reproduction gamut in the lightness and chroma coordinates and the lightness axis is outside the lightness range of the reproduction gamut, a central point between the lightness of the cusp of the reproduction gamut and a minimum value of the lightness of the reproduction gamut is decided as the focal point of the color gamut mapping.

5. The color gamut mapping method according to claim 4, wherein, in the mapping of the original gamut to the reproduction gamut,
   if the chroma and lightness data is located in a first area formed by a first reference line for connecting the coordinate of the cusp of the original and/or reproduction gamut with the lightness axis, and the lightness axis, the mapping is performed according to a first mapping slope having the same inclination as the first reference line,
   if the chroma and lightness data is located in a second area formed by a second reference line for maintaining the same lightness as the focal point and the first reference line, the mapping is performed according to a second mapping slope directed to the focal point; and
   if the chroma and lightness data is located in a third area formed by the second reference line and the lightness axis, the mapping is performed according to a third mapping slope for changing only the chroma while maintaining the lightness.

6. A color gamut compression method using the color gamut mapping method according to claim 1.

7. A color gamut extension method using the color gamut mapping method according to claim 1.

8. A liquid crystal display device for displaying on a liquid crystal panel image data which is output by mapping an original gamut to a reproduction gamut using the color gamut mapping method according to claim 1.

* * * * *